United States Patent [19]
Carlisle

[11] 4,053,671
[45] * Oct. 11, 1977

[54] ARTICLE HAVING EDGE-SEALED FILMS

[76] Inventor: Richard S. Carlisle, 1051 Broadway, Thornwood, N.Y. 10594

[*] Notice: The portion of the term of this patent subsequent to Jan. 20, 1993, has been disclaimed.

[21] Appl. No.: 615,816

[22] Filed: Sept. 22, 1975

Related U.S. Application Data

[60] Division of Ser. No. 326,278, Jan. 24, 1973, Pat. No. 3,933,563, and a continuation-in-part of Ser. No. 231,288, March 2, 1972, Pat. No. 3,815,794, and Ser. No. 256,850, May 25, 1972, abandoned.

[51] Int. Cl.² .......................... B32B 3/02; B32B 3/26; B32B 7/04; B32B 31/20; B32B 31/26
[52] U.S. Cl. .................................. 428/157; 156/251; 156/306; 428/172; 428/192; 428/195
[58] Field of Search ............... 428/157, 172, 195, 192; 156/251, 295, 289, 306

[56] References Cited

U.S. PATENT DOCUMENTS

| | | | |
|---|---|---|---|
| 2,232,062 | 2/1941 | Gurwick | 156/289 |
| 2,232,640 | 2/1941 | Schwartzman | 156/251 |
| 2,466,387 | 4/1949 | Curtis | 156/289 |
| 2,714,416 | 8/1955 | Fener | 428/157 |
| 2,735,797 | 2/1956 | Schjeldahl | 428/157 |
| 3,008,862 | 11/1961 | Haine et al. | 156/295 |
| 3,087,845 | 4/1963 | Patterson | 428/157 |
| 3,139,365 | 6/1964 | Andrews | 156/295 |
| 3,149,017 | 9/1964 | Ehrreick et al. | 156/251 |
| 3,192,091 | 6/1965 | Hey et al. | 156/295 |
| 3,423,277 | 1/1969 | Dipner | 428/157 |
| 3,441,460 | 4/1969 | Carmichael | 156/251 |
| 3,522,135 | 7/1970 | Page | 156/251 |
| 3,528,876 | 9/1970 | Clave-Bouhaben et al. | 428/157 |
| 3,736,219 | 5/1973 | McTaggart | 428/192 |

FOREIGN PATENT DOCUMENTS

| | | |
|---|---|---|
| 1,152,936 | 4/1961 | Germany |

*Primary Examiner* — J.C. Cannon

[57] ABSTRACT

A stack of many films of thermoplastic material is divided into sets of films by interposed layers of seal-inhibiting material. A heated cutter as of copper is used having a heat-storage portion and a blade projecting from the heat-storage portion, both shaped according to the desired edge seal. The hot blade is pressed against the stack to penetrate successive films, top to bottom. Thereafter, the blade represents a hot wall opposite to the parted edges of the film in the stack, causing transfer of heat into the stack for causing a controlled width of opposed films to become fused together. The time is not critical where the heat used is that which is stored in the cutter. The lateral surface of the blade extends from an edge, either perpendicular to the top surface of the stack or sloping away from the outline of the cut stack.

The edge seal is ideally about 20% thicker than the combined thickness of the films forming a finished article, but it can be much thicker. The inner surface of a pair of films are face-to-face, well-suited to form a pressure-releasable valve in a spout of a container, especially a self-resealing valve.

9 Claims, 5 Drawing Figures

ARTICLE HAVING EDGE-SEALED FILMS

This is a division of Ser. No. 326,278, filed Jan. 24, 1973 (now U.S. Pat. No. 3,933,563) and a continuation-in-part of application Ser. No. 231,288, filed Mar. 2, 1972 (now U.S. Pat. No. 3,815,794) and application Ser. No. 256,850, filed May 25, 1972 (now abandoned).

This invention relates to a method and apparatus for producing plastic-film articles having sealed edges, and to the product.

BACKGROUND OF THE INVENTION

In application Ser. No. 231,288 filed Mar. 3, 1972, it is shown that a pouch can be formed of thermoplastic films edge-sealed together, including a spout constituting a valve that is releasable by internal fluid pressure. Ideally the films are face-to-face adjacent the fused edges. Application Ser. No. 256,850 discloses methods of making many such articles (as well as others) concurrently. Sets of films are stacked, cut out according to the desired shape of the articles, and subjected to fusing heat along the outline where the films are to be edge-sealed together. Each set of films forms one article, each stack thus yielding as many articles as there are sets of films in the stack. Seal-inhibiting material is interposed between each set and the next in the stack so that the articles of the stack are readily separated from each other. Two methods are disclosed in application Ser. No. 256,850. In one method, the films are pre-cut and stacked with their edges aligned or they are cut while stacked, and then aligned edges are exposed to fusing heat. In the other method, a hot cutter advances along the outline of the articles to be made, making fused seams along the edges of the films of each set in the stack.

SUMMARY OF THE INVENTION

The present invention provides a third method of making plural edge-sealed articles concurrently, utilizing a stack of sets of thermoplastic films separated by layers of seal-inhibiting material. Apparatus having novel features useful in carrying out the method are also provided. A cutter is heated well above the fusion temperature of the films. In its preferred form, the cutter includes a film-penetrating blade or wall whose shape corresponds closely to the edge-seal of the articles, and the cutter includes a heat-storing portion of enlarged thickness as a presently preferred form of means to supply heat to the wall. The edge of the cutter is pressed against the stack of sets of films. In broad concept, sufficient pressure could be used to cut the films mechanically, but such a large amount of pressure is not used in the preferred method described below. Instead, the edge of the hot cutter penetrates the stack under much more moderate pressure. In so doing, the cutter fuses together a narrow margin of the films of each set in the stack. The edge seals thus formed are extended in width and made more secure by sustained exposure of the outline of the severed stack of films to the heat of the cutter wall.

The blade or wall of the cutter has a heat-emitting surface extending perpendicularly away from the edge or sloping outward, i.e., away from the outline of the cut stack, thereby producing relatively undistorted edge seals. The thickness of the seals is somewhat greater than the combined thickness of the joined films. The width of the seals is enhanced by subjecting the films to opposed pressure as by passing them through pressure rolls or otherwise subjecting the margins to squeezing pressure while the margins are at least partially molten and tacky. Pouches of the type in application Ser. No. 231,288 are economically and effectively mass-produced by this method.

The nature of the invention, including the foregoing and other novel features and advantages will be better appreciated from the detailed description below of the presently preferred and exemplary embodiment of its various aspects, reference being made in the description to the accompanying drawings.

Figure 2:
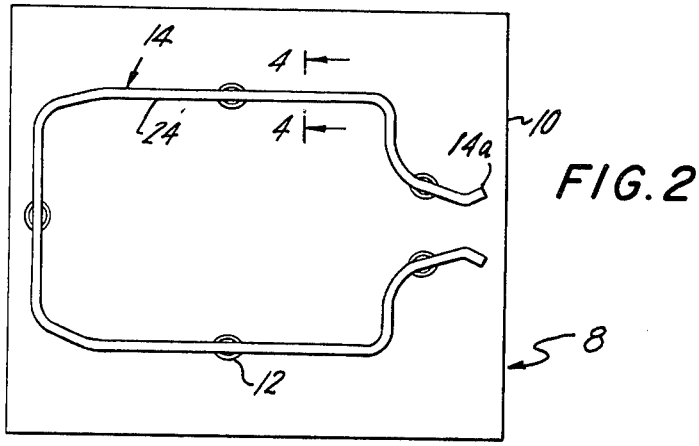
FIGS. 2 and 3 are front and side views, respectively, of a cutter, many of which are included in the apparatus of FIG. 1.
Figure 3:
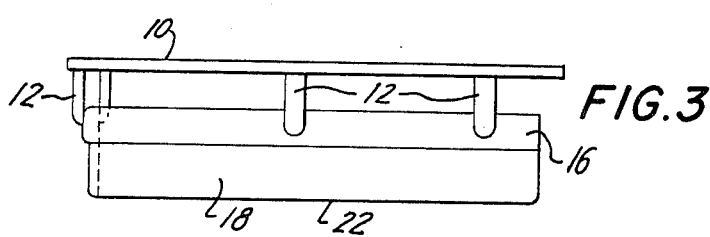

FIGS. 2 and 3 illustrate a form of cutting and edge-sealing unit 8 that is effective for present purposes. Support plate 10 may be of any suitable heat-resistant material, preferably of low heat conductivity and low specific heat, such as an asbestos-based panel or laminate. Clips 12 provide secure mechanical support at isolated points for a cutter 14 having a contour or shape as shown in FIG. 2 that corresponds closely (but not exactly) to the shape of the articles to be made, the outline of a pouch in this instance. Clips 12 provide secure mechanical support for the cutter, without extracting significant heat from the cutter.

Figure 4:
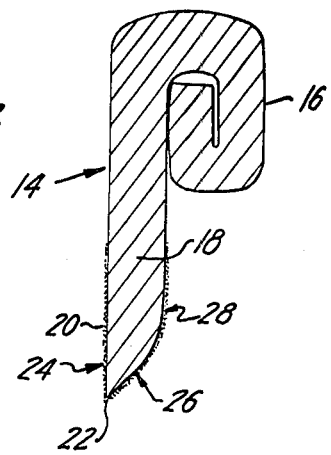
FIG. 4 is an enlarged transverse cross-section through a cutter as viewed at the plane 4—4 of FIG. 2.

As seen in FIG. 4, cutter 14 has a heat-storing mass 16 and a blade or wall 18, made of sheet-metal rolled on itself to constitute the heat-storing mass 16. The cutter should be of a metal having high thermal conductivity, and in the form illustrated the metal should have high specific heat, copper for example. A release coating 20 such as Teflon (polytetrafluorethylene) or silicone should cover the active surfaces of the blade. If silicone is used, it should be renewed after each sever-seal operation, whereas Teflon is virtually permanent.

Edge 22 which lies in a plane (FIG. 3) should be as sharp as a butter knife or sharper. One surface 24 of blade 18 extends perpendicularly away from the plane of edge 22 in one preferred example, while the opposite surface has a first portion 26 that slopes prominently away from edge 22 and then extends to a portion 28 parallel to surface 24. The shape of the cutter (as viewed in FIG. 2) identifies the article to be cut as being inside the contour of the cutter, and surfaces 24 and 28 are inside and outside, respectively, i.e., facing the edges of the articles or facing away from the edges of the articles.

This cutter can be used in producing many articles such as pouches in a single operating stroke. Cutter 14 is heated to a temperature well above the melting temperature of the thermoplastic material being formed into pouches. The upper temperature is not normally critical. As a practical limit, to should be below the temperature at which the plastic smokes, which is of the order of 1000° F. The cutter is pressed, edge 22 foremost, against a stack of pairs of thermoplastic films with seal-inhibiting layers separating each pair of films from the next. As examples, the seal-inhibiting layer may be silicone oil, or it may be a coating of cornstarch or a mineral power, or it may be a layer of plastic that does not form a fused seal to the film below in the stack. Other suitale thermoplastic films and seal-inhibiting materials are mentioned in said application Ser. No. 256,850. In any case, the seal-inhibiting layer is one that is readily penetrated by the hot cutter. As an example, a cutter having a copper blade 0.020 to 0.030 inch thick works well. Pressure against the cutter is not nearly great enough for a cold die-cutting operation. About 5 to 30 pounds pressure against the cutter of the thickness in the above example, and having an edge about 27 inches long, was ample in a test.

Figure 5:
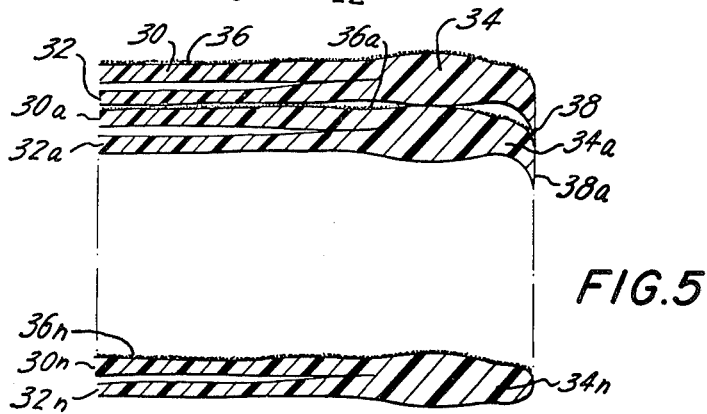
FIG. 5 is a cross-section of a stack of polyethylene films edge-sealed together in pairs by the method and apparatus of the other figures, magnified about 40X.

A stack of polyethylene films, assembled in pairs and with silicone oil seal-inhibiting layers between the pairs, can readily be formed by first pressing the pre-heated blade to sever all of the films and then allowing the blade to rest opposite the cut-out outline of the films while above-fusion heat continues to reach the edges of the films. The result is shwon in FIG. 5, where pairs of films 30, 32 . . . 30a, 32a . . . 30n, 32n which is polyethylene in an example are united by fused seals 34, 34a . . . 34n. Film 30 in each instance bears a seal-inhibiting layer 36, 36a . . . 36n. Without harm, one surface of each film 32, 32a . . . 32n could also have a seal-inhibiting coating, that is, film 32 could have a seal-inhibiting coating on its surface facing the seal-inhibiting layer on film 30a, etc. Thus, pouches can be made of polyethylene films each having a covering laminated layer of nylon; and in that case, the composite films can be stacked in pairs with the polyethylene sides facing each other and the pairs of nylon sides facing each other. Since the nylon sides do not fuse together in this process, while the polyethylene does, the fused edge seals are formed to produce pouches whereas the successive pouches remain readily parted. Some weak edge bonds 38 are formed where cutter edge 22 "wipes" fused polyethylene across the side of the stack, but such edge bond is easily torn for separating each pouch from the next.

In the illustration (FIG. 5), an edge seal is somewhat thicker than the combined thickness of the separate films. The thickness of the seal can be much greater than the combined thickness of the separate films, depending on the thermoplastic film used and on the temperature of the cutter and on the duration of exposure of the edges being fused to temperatures above fusion. Typically, the edge-seals made in this way are markedly wider than their thickness, and their thickness is greater (e.g., 20%)than the combined thicknesses of the films. The fusing temperature developed at the edges of a stack of many sets of films penetrates deeper into the stack and results in wider edge seals than would occur if a single pair of films were being cut and sealed, because of heat conduction from each film to the others in the stack. Pressure is not needed in forming the seals; pressure may be applied to the stack of films by a plate (not shown) located within the outline of the cutter for holding the films flat and for insuring ejection of the stack from the cutter in case ejection becomes a problem.

Heat is extracted from the hot cutter's edge upon contact with the stack of films. This does not chill the cutting edge because of the continued supply of heat from heat-storage portion 16 to the highly heat-conductive blade. By proper proportioning of the stack thickness, the mass of metal in storage region 16 and the thickness of the blade 14, the temperature of the cutter can be maintained above the fusion temperature of the films after all the films have been cut to shape, i.e., the cutter has penetrated to the bottom of the stack. Cutting through a given stack may take four seconds, for example, and the cutter may remain in its end position two seconds longer. During the latter period, above-fusion heat from the blade is radiated from surface 24 to the periphery of the cut-out stack. The films fuse together in sets of two or more films along their edges, as they are severed. The edge seals become wider and more secure because of subsequent exposure of the severed stack to the hot cutter.

The bottom pair of films is subjected to fusing temperature for a briefer period of time than the edges of the top pair of films. In some situations, this effect may be inconsequential, because the severed and fused edges tend to become retracted from the lateral surface of the blade, so that there is an automatic reduction in the rate of heat transfer to the fused edges. Where the retraction of the sealed edges from the blade is not sufficient, surface 24 of the wall or blade of the hot cutter may be modified to slope moderately away from the margin of the cut-out stack of films. Accordingly, while the top films are exposed to heat from the cutter for a longer period than the edges of the films at the bottom of the stack, still there is some equalization in heating of the margins of the films, top to bottom, where surface 24 slopes outward. The resulting separation of the cutter from the film edges near and at the top of the stack after full penetration of the cutter to the bottom of the stack tends to transfer less heat per unit time from the hot cutter to the margins of the films, thereby approximating an equalization of the heating effect of the blade in causing edge fusion of the pairs of films at different levels in the stack.

Figure 1:
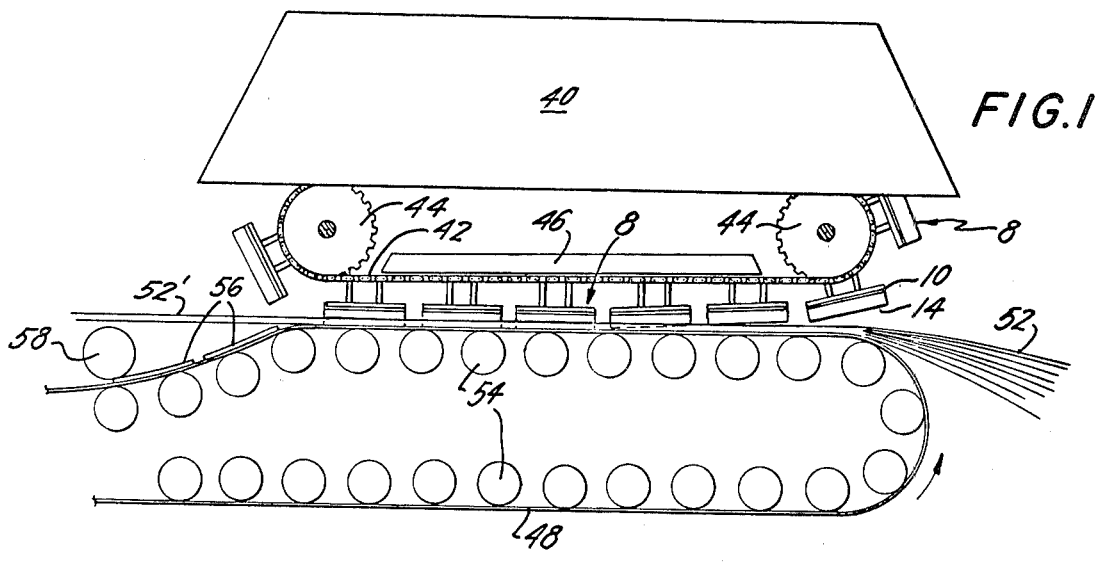
FIG. 1 is a lateral view of illustrative apparatus for producing the novel products pursuant to the novel method of the invention.

FIG. 1 shows apparatus for making stacks of edge-sealed films. It includes a hot chamber 40 for heating cutters 14 during the slow advance of cutter-carrying chain conveyor 42 around sprockets 44. Electric, infrared, or even flame heaters can be used to bring cutters 14 to the desired temperature. A long flat bar 46 at the back of the conveyor or at the back of plates 10 cooperates with units 8 (via suitable anti-friction means) to provide firm backing and location of the planes of cutter edges 22 as the units 8 travel to the left below that bar. An endless belt 48 is arranged around many rollers including driven rollers and freely rotatable rollers. Many strips 52 are supplied to endless belt 48. Strips 52 are divided into sets of two or more thermoplastic films in each set separated from the next set by a seal-inhibiting layer which may be a coating, a strip, or a laminate on a film. At the right, belt 48 is disposed at a level slightly too low for the films to be engaged by the hot cutters. Belt-supporting and driving rollers 54 gradually cause films 52 to be lifted toward the cutters 14, as the belt advances. After part (e.g., about two-thirds) of the horizontal travel of the cutters along bar 46, the distance of cutters 14 from the rollers 54 is such that penetration of all the films is complete. Belt 48 is of a suitable material, or is covered by a suitable strip of material, so as not to be affected by the heat of the cutters and to be non-sticking in relation to the fused plastic at the advancing edges of the cutters. Conveyor 42 of the cutters and belt 48 advance in synchronism under bar 46.

Continued travel of the cut-out stacks of film within the outlines of cutters 14 (see FIG. 2) exposes the edges of the films in the stack to the film-fusing heat given off by surface 24 (FIG. 4) of cutter blades or walls 18. Substantial amounts of heat are transferred to the films as the cutter edges fuse the plastic in penetrating into the stack of films 52. However, the conductivity of the metal wall or blade 18 transfers stored heat from cutter portion 16, so as to maintain film-fusing temperature of surface 24 a while longer. Optionally, one edge of each of the strips 52 is disposed near ends 14a of the cutters, so as to leave an unsealed edge portion of each article in the stack, where the articles are pouches and require a filling port. Pairs of films 52 may have mutually off-set or staggered edges opposite cutter end-portions 14a to facilitate opening of the filling ports later on, when the pouches are to be filled. Cut-out and edge-sealed stacks 56 of edge-sealed articles emerge at the left. The waste portion 52′ of strips 52 is drawn to a suitable scrap receiver, not shown. Incidentally, the films of scrap 52′ are united by the sloping portion 26 (FIG. 4) of the hot cutters 14. A pressure plate (not shown) may be included within the outline of each cutter 14 to help eject each stack 56 as each cutter starts to travel around the left-hand sprocket 14. Such a plate can be pressed by gravity against the top of the films during travel of the cutters under bar 46. When units 8 next advance into heater 40, the units are inverted and such pressure plates would recede gravitationally, to avoid being heated unduly when cutters 14 are being heated.

A period of time (about six seconds, for example) elapses after each stack has been formed by penetration of a cutter 14 and until stacks 56 are delivered at the left. The temperature of the cutters may have dropped to a point near or below fusing heat, and in that case, further prolonged exposure of the film stacks to the cutter walls would be of little consequence. The distance of travel of the fully cut-out stacks of film while the stacks are exposed to the heat of the cutter walls, and the temperature and the heat-storing capacity of the cutters, are factors affecting the width of the fused edge seals that are formed. The cutters could incorporate electrical heating elements thus replacing heater 40, and in that event the "on" time of current to such heaters and the amperage would be additional factors by which to control the width of the fused edge seals.

At the time the stacks leave the cutters, the margins of the stacks are hot, at least partially molten and tacky. The uniformity of the width of the seals may be enhanced by promptly subjecting the stacks to pressure, as by passing the stacks between diagrammatically illustrated pressure rolls 58 or otherwise subjecting the margins of the stacks to squeezing pressure.

The foregoing represents an illustrative embodiment of the invention in its various aspects, but certain features may be used apart from others, and considerable modification may be undertaken by those skilled in the art. Therefore, the invention should be construed broadly in accordance with its full spirit and scope.

What is claimed is:

1. An article comprising a set or thermoplastic films confronting each other over at least the major area thereof and having a marginal seal of greater thickness than the initial thickness of said set of films and said seal extending from the confronting area of the films to and along a common edge that forms at least part of the outline of the article, said seal resulting from thermally fusing the material of said films together by heating a blade above the fusion temperature of the films and pressing the blade against a set of confronting thermoplastic films and thereby severing the films and forming a common sealed margin and heat-softening the films along the sealed margin across a markedly greater width than said greater thickness and fusing them together to form a seal of at least said greater thickness and enhancing the uniformity of the width of the seal by applying opposed pressure thereto while material of the films is at least partially molten and tacky so as to yield said marginal seal of said greater thickness and said greater thickness extending across the seal for a distance markedly greater than said greater thickness, the confronting films being disposed in essentially face-to-face contact adjacent the seal.

2. An article in accordance with claim 1 comprising two laminated films each having a high-melting-temperature layer and a heat-sealable lower-melting-temperature thermoplastic layer, the lower-melting-temperature layers facing each other and being fused in the seal.

3. An article in accordance with claim 1 wherein the films are essentially face-to-face adjacent the seal resulting from application of opposed pressure to the films adjacent the seals while opposed pressure is applied to the seals as aforesaid.

4. An article in accordance with claim 1 wherein said films are polyethylene films.

5. An article in accordance with claim 2 wherein said lower-melting-temperature thermoplastic layer is polyethylene.

6. An article in accordance with claim 2 wherein said lower-melting-temperature thermoplastic layer is polyethylene and wherein said high-melting-temperature layer is nylon.

7. An article comprising a pair of laminated thermoplastic films, each film having a high-melting-temperature thermoplastic layer and a heat-sealable lower-melting-temperature thermoplastic layer, the lower-melting-temperature layers of the two films facing each other and the films confronting each other over at least the major area thereof and having a marginal seal of greater thickness than the initial thickness of said set of films and said seal extending from the confronting area of the films to and along a common edge that forms at least part of the outline of the article, said seal resulting from thermally fusing the material of said films together by heating a blade above the fusion temperature of the films and pressing the blade against a said pair of confronting thermoplastic films and thereby severing the films and forming a common sealed margin and heat-softening the films along the sealed margin across a markedly greater width than said greater thickness and fusing them together to form a seal of at least said greater thickness and enhancing the uniformity of the width of the seal by applying opposed pressure thereto while material of the films is at least partially molten and tacky so as to yield said marginal seal of said greater thickness and said greater thickness extending across the seal for a distance markedly greater than said greater thickness.

8. An article in accordance with claim 7 wherein said lower-melting-temperature thermoplastic layer is polyethylene.

9. An article in accordance with claim 7 wherein said lower-melting-temperature thermoplastic layer is polyethylene and wherein said high-melting-temperature thermoplastic layer is nylon.

* * * * *